US008176609B2

(12) United States Patent
Branon

(10) Patent No.: US 8,176,609 B2
(45) Date of Patent: May 15, 2012

(54) MAGNETIC CYLINDER HEAD WASHER REMOVAL TOOL

(76) Inventor: Timothy J. Branon, Madisonville, KY (US)

( * ) Notice: Subject to any disclaimer, the term of this patent is extended or adjusted under 35 U.S.C. 154(b) by 404 days.

(21) Appl. No.: 12/321,278

(22) Filed: Jan. 16, 2009

(65) Prior Publication Data

US 2010/0037442 A1 Feb. 18, 2010

Related U.S. Application Data

(60) Provisional application No. 61/188,913, filed on Aug. 14, 2008.

(51) Int. Cl.

| | |
|---|---|
| ***B25B 27/14*** | (2006.01) |
| ***B25B 27/00*** | (2006.01) |
| ***B23P 19/04*** | (2006.01) |
| ***B21B 45/04*** | (2006.01) |
| ***B21C 43/00*** | (2006.01) |
| ***B23K 7/00*** | (2006.01) |
| ***A44B 19/00*** | (2006.01) |
| ***E02D 3/02*** | (2006.01) |
| ***E02D 5/00*** | (2006.01) |
| ***E02D 17/00*** | (2006.01) |
| ***E02D 19/00*** | (2006.01) |

(52) U.S. Cl. ......... 29/278; 29/221.6; 29/33 A; 29/81.11; 81/488; 405/302.3

(58) Field of Classification Search .................... 29/278, 29/81.11, 33 A, 222, 225, 240.5, 221.6, 240, 29/242, 243, 265; 472/82; 310/14, 15, 17

See application file for complete search history.

(56) References Cited

U.S. PATENT DOCUMENTS

| | | | | |
|---|---|---|---|---|
| 5,327,631 | A * | 7/1994 | Lincavage | 29/271 |
| 5,515,250 | A * | 5/1996 | Ortega | 362/119 |
| 5,745,968 | A * | 5/1998 | Genest et al. | 29/270 |
| 6,004,077 | A * | 12/1999 | Saab | 405/302.3 |
| 6,269,717 | B1 * | 8/2001 | Bollinger | 81/177.2 |
| 6,439,303 | B1 * | 8/2002 | Sorhus et al. | 166/99 |
| 6,733,397 | B1 * | 5/2004 | Barrett | 472/82 |
| 2003/0040671 | A1 * | 2/2003 | Somogyi et al. | 600/424 |
| 2007/0124921 | A1 * | 6/2007 | Whitehead | 29/724 |

OTHER PUBLICATIONS

"Magnetic Washer Remover Tool #67700," SPTool.com, Published date Unknown, <http://www.sptool.com/index.php?page=shop.product_details&product_id=64&flypage=flypage.tpl&pop=0&option=com_virtuemart&Itemid=11>.*

"Remover, Magnetic Washer," Snapon.com, Published date unknown, <http://buy1.snapon.com/catalog/item.asp?store=snapon-store&item_ID=85325&group_ID=1585>.*

"Magnetic Washer Removal Kit No. MST6770," pten.com, published date unknown, <http://directory.pten.com/product/10105896/Matco_Tools_Magnetic_Washer_Removal_Kit_No_MST6770>.*

* cited by examiner

*Primary Examiner* — Monica Carter
*Assistant Examiner* — Seahee Yoon
(74) *Attorney, Agent, or Firm* — Gary K. Price

(57) ABSTRACT

A removal tool for removing washers located on each cylinder head stud when performing a valve job on an automobile engine. The removal tool includes a cylindrical body having a handle portion and a washer removal end opposite the handle. The cylindrical body includes a central bore that extends the axial length of the body. The removal end includes an end surface having at least one embedded magnet member and defines a pickup surface for use in attracting and securing the easy removal of automotive cylinder head stud washers and automotive cylinder head valve spring spacers valve from the cylinder head.

7 Claims, 2 Drawing Sheets

MAGNETIC CYLINDER HEAD WASHER REMOVAL TOOL

CROSS REFERENCES TO RELATED APPLICATIONS

U.S. Provisional Application for Patent No. 61/188,913, filed Sep. 8, 2008, with title "Magnetic Cylinder Head Washer/Shim Removal Tool" which is hereby incorporated by reference. Applicant claim priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable.

BACKGROUND OF THE INVENTION

1. Field of the Invention

This present invention relates to the field of hand tools and more particularly, to a tool for removal of automotive cylinder head stud washers and automotive cylinder head valve spring spacers.

2. Background Information

The automobile engine "valve job" involves removal of the valve cover and cylinder head, followed by disassembly and removal of each valve from the cylinder head for replacement or repair. This known process includes the removal of a washer from each cylinder head stud. It has proven to be very challenging for most mechanics to access, and remove these washers from each cylinder head stud. Part of the difficulty is that the washer is rather small and difficult to manipulate. To make matters worse, these washers are located in a very close-fitted recess which makes the parts somewhat inaccessible. As such, a need exists for a hand tool to facilitate the removal of these washers from each of the cylinder head studs. The present invention meets this need.

SUMMARY OF THE INVENTION

As discussed in the Background Information, it has proven to be difficult for mechanics to access the washers located on each cylinder head stud when performing a valve job on an automobile engine. Part of the difficulty is that the washer is rather small and difficult to manipulate and, these washers are located in a very close-fitted recess which makes the parts somewhat inaccessible. The present invention, a magnetic cylinder head washer removal tool, provides for easy removal of these washers. The removal tool includes a cylindrical body having a handle portion and a washer removal end opposite the handle. The cylindrical body includes a central bore that extends the axial length of the body. The removal end includes an end surface having at least one embedded magnet member and defines a pickup surface for use in attracting and securing the easy removal of automotive cylinder head stud washers and automotive cylinder head valve spring spacers valve from the cylinder head.

DESCRIPTION OF THE PREFERRED EMBODIMENTS

In accordance with the present invention, a magnetic cylinder head washer removal tool is disclosed. The removal tool of the present invention is directed to a small, compact tool for enabling the easy removal of automotive cylinder head stud washers and automotive cylinder head valve spring spacers. In the broadest context, the removal tool of the present invention consist of components configured and correlated with respect to each other so as to attain the desired objective.

Figure 1:
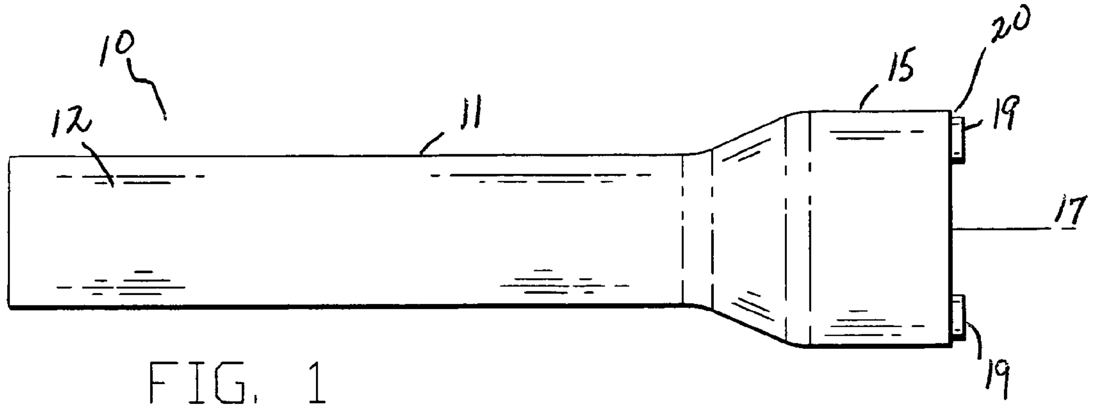
FIG. 1 is a side view of the preferred embodiment of the present invention, a Magnetic Cylinder Head Washer Removal Tool.
Figure 2:
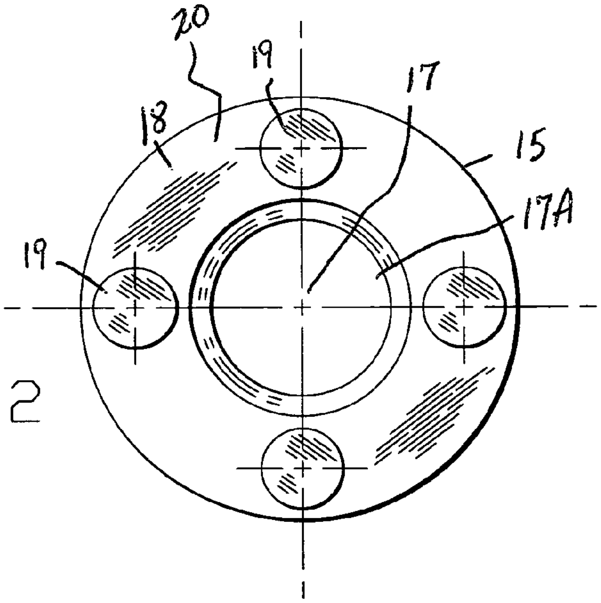
FIG. 2 is a front view of the removal tool of FIG. 1.
Figure 3:
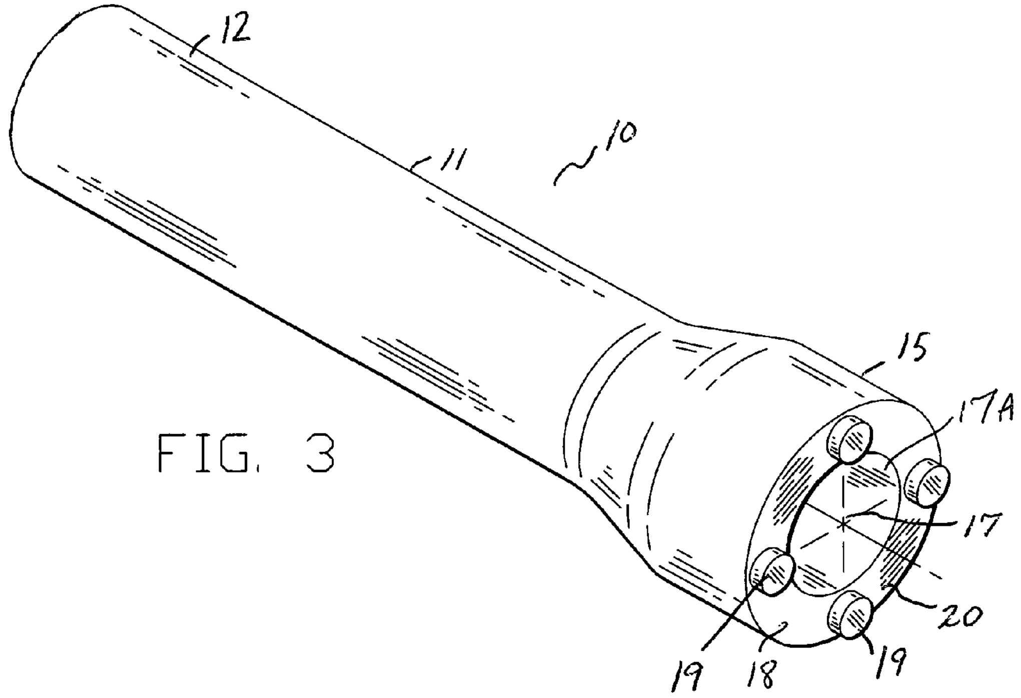
FIG. 3 is a top perspective view of the invention.

FIGS. 1-3 illustrate a magnetic cylinder head washer removal tool 10 made in accordance with the present invention. The removal tool 10 generally includes a cylindrical body 11 having a handle 12 at one end and a distal end 15 opposite the handle 12. As will be described, the distal end 15 designed to enable the easy removal of automotive cylinder head stud washers and automotive cylinder head valve spring spacers from the cylinder head in very close-fitted, difficult to access locations. As best shown in FIGS. 2 & 3, the tool's cylindrical body 11 further includes a central bore 17 that extends the axial length of the body 11.

Referring to FIG. 2, the distal end 15 includes an end surface 18 and a central cavity 17A that passes through the end surface 18 and is in fluid communication with the central bore 17. At least one magnet member 19 is embedded on the end surface 18. The end surface 18 having the at least one magnet member 19 thereon, is preferably a substantially cylindrical configuration that defines a pickup surface 20 for use in attracting and securing the easy removal of automotive cylinder head stud washers and automotive cylinder head valve spring spacers from the cylinder head.

In accordance with the present invention, the at least one magnet member 19 may be any suitable magnet having a sufficient strength for retrieving automotive cylinder head stud washers and automotive cylinder head valve spring spacers. Of course, different strength magnets could be used for different applications. Specific types of magnets are well known to the person of ordinary skill in the art. The at least one magnet 19 is preferably secured to the end surface 18 by an adhesive.

The magnets 19 used for the tool are cylindrical magnets inserted equidistant from one another in the end surface 18. The magnets 19 protrude from the end surface 18 so that the magnets 19 are the first surface of the tool to contact the work piece.

To summarize the main features of the removal tool 10, one end of the tool includes an axial cavity and at least one embedded magnet that is sized for fitting on the top surface of the removal end of the tool. The axial cavity is sized to loosely receive the cylinder head stud so that in application, the cavity receives the stud which allows the embedded magnet to contact, draw up and remove the washer from the cylinder head stud. The other end of the tool defines a handle for gripping the tool during application as described in this specification.

Both the handle 12 and the body 11 of the removal tool 10 are preferably made from aluminum which is a rigid, strong material and will not damage the surface of the cylinder head during application. However, other materials known in the art can be used to carry out the described objectives.

As mentioned above, the current invention addresses the problems associated with accessing the washers located on each cylinder head stud when performing a valve job on an automobile engine. The removal tool of the present invention is directed to a small, compact tool for enabling the easy removal of automotive cylinder head stud washers and automotive cylinder head valve spring spacers. Use of the hand tool as shown in the drawings is as follows: A user first lowers the tool with distal end 15 as the guide over the cylinder head stud so that the stud is received within the axial cavity 17A, and continues to lower the tool until the end surface 18 and more particularly the magnetic members 19 are in contact with the washer disposed on the cylinder head. The magnetic force of attraction from the magnetic members 19 will raise the cylinder head stud washer from the cylinder head as the tool is upwardly withdrawn from the cylinder head stud. The user can then simply remove the washer from the end surface of the tool by hand. The removal time typically taking less than a minute to perform.

Figure 4:
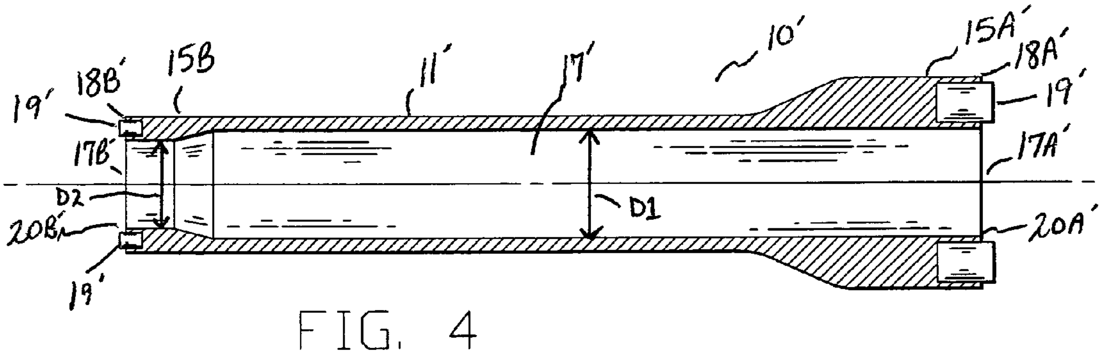
FIG. 4 is a sectional side view of an alternate embodiment of the present invention.

Referring to FIG. 4, in an alternate embodiment of the present invention, tool 10' includes a hollow body 11' with a first removal end 15A' as previously described, and a second removal end 15B' opposite the first removal end 15A'. The embodiments of the first removal end 15A' being identical to the second removal end 15B' except that the diameter of the central cavity 17B' of the second removal end 15B' is less than the central cavity 17A' of the first removal end 15A'. As such, the following will only describe end 15B' as it is a mirror image of end 15A' except, that as mentioned, the central cavities 17A' and 17B' have different diameters.

More particularly, the second removal end 15B' includes an end surface 18B' and the central cavity 17B' that passes through the end surface 18B' and is in fluid communication with a central bore 17'. At least one magnet member 19' is embedded on each of the end surfaces 18A', 18B'. The end surface 18B' having the at least one magnet member 19' thereon, is preferably a substantially cylindrical configuration that defines a pickup surface 20B' for use in attracting and securing the easy removal of automotive cylinder head stud washers and automotive cylinder head valve spring spacers valve from the cylinder head.

As further illustrated in FIG. 4, the central bore 17' defines a first diameter designated as D1 and a second diameter designated as D2. The central bore 17' has a smaller diameter D2 near the second end 15B'.

The at least one magnet member 19' may be any suitable magnet having a sufficient strength for retrieving automotive cylinder head stud washers and automotive cylinder head valve spring spacers. Of course, different strength magnets could be used for different applications. Specific types of magnets are well known to the person of ordinary skill in the art.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent compositions and methods. For example, the application given described the present removal tool primarily for being used to remove automotive cylinder head stud washers by placing the tool over a cylinder head stud. However, it should be understood from the description given that the removal tool can be used for removing washers, spacers and the like in other applications such as, but not limited to, being placed over the top of an automotive engine valve stem.

As such, it will be obvious to those skilled in the art that modifications may be made to the embodiments described above without departing from the scope of the invention. Thus the scope of the invention should be determined by the claims in the formal application and their legal equivalents, rather than by the examples given.

I claim:

1. A tool for removing automotive cylinder head stud washers and automotive cylinder head valve spring spacers, said tool comprising:

a cylindrical body having a handle at one end and a first cylinder end and first cylinder pick-up surface having at least one magnet opposite the handle, said first cylinder end having a first diameter, said first cylinder pick-up surface comprising an end surface and a first central cavity that passes through the end surface, a plurality of magnets arranged equidistant around said first central cavity on the first cylinder end, the plurality of magnets forming the first cylinder pick-up surface for engaging a part protruding from said end surface, a second cylinder end opposite said first cylinder end, said second cylinder end having a second cylinder pick-up surface and a second plurality of magnets arranged equidistant around a second central cavity on said second cylinder end forming said second cylinder pick-up surface, said second cylinder end having a diameter smaller than said first cylinder end, wherein the first and second central cavity are of a diameter larger than a cylinder head stud such that the first and second pick-up surfaces can engage a part on said stud, wherein said cylindrical body further includes a central bore that extends the axial length of said body and wherein said first central cavity and said second central cavity is in fluid communication with said central bore.

2. The tool as recited in claim 1, wherein said part is a washer and said first magnets engage said washer prior to said end surface.

3. The tool as recited in claim 1, wherein said at least one magnet is secured to said end surface by an adhesive.

4. The tool as recited in claim 1, wherein said central bore has a smaller diameter near said second end.

5. A tool for removing automotive cylinder head stud washers and automotive cylinder head valve spring spacers, said tool comprising:

a cylindrical body having a central bore through its entire length, a first cylindrical end having a first end surface and a plurality of equally spaced magnets projecting from said first end surface and;

a second cylindrical end spaced from the first cylindrical end, said second cylindrical end having a second end surface and a plurality of equally spaced magnets projecting from said second end surface;

wherein the second end surface has a diameter smaller than said first end surface.

6. The tool as recited in claim 5, wherein said magnets are secured to said first end surface and said second end surface by an adhesive.

7. The tool as recited in claim 3, wherein said central bore has a larger diameter near said first end.

* * * * *